(12) United States Patent
Lee

(10) Patent No.: US 10,791,206 B2
(45) Date of Patent: Sep. 29, 2020

(54) DISPLAY DEVICE AND ELECTRONIC DEVICE COMPRISING THE SAME

(71) Applicant: LG DISPLAY CO., LTD., Seoul (KR)

(72) Inventor: Daljae Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/299,012

(22) Filed: Oct. 20, 2016

(65) Prior Publication Data
US 2017/0126865 A1 May 4, 2017

(30) Foreign Application Priority Data

Oct. 29, 2015 (KR) .......................... 10-2015-0151417

(51) Int. Cl.
  *H04M 1/02* (2006.01)

(52) U.S. Cl.
  CPC ........ *H04M 1/0266* (2013.01); *H04M 1/0268* (2013.01)

(58) Field of Classification Search
  CPC .......................... H04M 1/0266; H04M 2201/38
  USPC .......................................................... 455/566
  See application file for complete search history.

(56) References Cited

U.S. PATENT DOCUMENTS

| | | | | |
|---|---|---|---|---|
| 2006/0005922 A1* | 1/2006 | Watanabe | ................. | H01J 9/52 156/291 |
| 2008/0014787 A1* | 1/2008 | Kim | ..................... | G06F 1/1626 439/517 |
| 2013/0003271 A1* | 1/2013 | Obara | .................... | A63F 13/08 361/679.01 |
| 2013/0083491 A1 | 4/2013 | Rappoport et al. | | |
| 2013/0169907 A1* | 7/2013 | Wang | ....................... | G09F 9/35 349/96 |
| 2013/0201093 A1* | 8/2013 | Kim | ....................... | G06F 3/033 345/156 |
| 2014/0066140 A1* | 3/2014 | Baek | .................... | H04M 1/026 455/575.1 |
| 2014/0092631 A1* | 4/2014 | Fujii | ................ | G02F 1/133608 362/611 |
| 2014/0213324 A1* | 7/2014 | Tan | ..................... | H04M 1/0268 455/566 |
| 2014/0217382 A1* | 8/2014 | Kwon | ................. | H01L 51/0097 257/40 |
| 2014/0231763 A1* | 8/2014 | Kim | .................... | H01L 27/3218 257/40 |
| 2014/0247959 A1* | 9/2014 | Yamanaka | ............ | H04R 1/345 381/388 |
| 2015/0130767 A1* | 5/2015 | Myers | ................. | H04M 1/0268 345/174 |
| 2015/0138041 A1* | 5/2015 | Hirakata | ............ | H01L 51/0097 345/1.3 |
| 2015/0227172 A1* | 8/2015 | Namkung | ............ | G06F 1/1652 345/173 |

(Continued)

FOREIGN PATENT DOCUMENTS

CN 103531103 A 1/2014

*Primary Examiner* — Gennadiy Tsvey
(74) *Attorney, Agent, or Firm* — Birch, Stewart, Kolasch & Birch, LLP

(57) ABSTRACT

A display device can include a support plate having a flat area and a bent area, a display panel bonded to the support plate and bent along the bent area of the support plate, and a cover glass bonded to the display panel and bent along the bent area of the support plate.

18 Claims, 12 Drawing Sheets

(56) References Cited

U.S. PATENT DOCUMENTS

| | | | |
|---|---|---|---|
| 2015/0331444 A1* | 11/2015 | Rappoport | G06F 1/1601 362/249.02 |
| 2015/0341478 A1* | 11/2015 | Bonar | H04M 1/11 455/575.1 |
| 2016/0172623 A1* | 6/2016 | Lee | H01L 51/5253 257/40 |
| 2016/0204183 A1* | 7/2016 | Tao | H01L 51/0097 |
| 2017/0288006 A1* | 10/2017 | Yang | G09F 9/33 |

* cited by examiner (a)

(b)

(a)

(b)

(a) Front (b) Side (c) Back

DISPLAY DEVICE AND ELECTRONIC DEVICE COMPRISING THE SAME

CROSS-REFERENCE TO RELATED APPLICATION

This application claims the priority benefit of Korean Patent Application No. 10-2015-0151417 filed on Oct. 29, 2015, which is incorporated herein by reference for all purposes as if fully set forth herein.

BACKGROUND OF THE INVENTION

Field of the Invention

The present invention relates to a curved display device and an electronic device comprising the same.

Discussion of the Related Art

Terminals may be divided into mobile/portable terminals and stationary terminals depending on their mobility. Mobile/portable terminals may be subdivided into handheld terminals and vehicle-mounted terminals depending on whether or not users can carry their terminals with them.

The features of the mobile terminals are becoming diversified. These features include data and voice communication, taking photos and videos with a camera, voice recording, playing music files through a speaker system, and outputting images or videos to a display, for example. Some phones have a game play feature added to it, or offer a multimedia player feature. Notably, recent mobile terminals can receive multicast signals to provide visual content, video, or television programs.

As the features of terminals have become diversified, they are implemented in the form of a multimedia player with combined features like taking photos and videos, playing music or video files, gaming, receiving broadcasts, etc. To support and enhance these features of terminals, structural and/or software parts of the terminals may need improvements.

Hereinafter, a terminal according to the related art will be described schematically with reference to FIGS. 1 and 2. FIGS. 1 and 2 are views schematically showing a terminal according to the related art.

Referring to FIGS. 1 and 2, the terminal according to the related art comprises a display module, a front cover 1101, a back cover 1103, a mid frame 1102, a mainboard 1104, a battery 1105, etc.

A display device according to the related art may be implemented as a flexible display such as a liquid crystal display, an organic light-emitting diode display (OLED display), etc. The display module comprises a display panel 1100 for such a flat panel display and a display panel driving circuit. Touch sensors may be placed on the entire screen of the display panel 1100.

A cover glass is placed on the front cover 1101 to cover the display panel 1100. The front cover 1101 covers the front of the terminal. The screen of the display panel 1100 is shown on the front of the terminal.

The display module, the mid frame 1102, the mainboard 1104, the battery 1105, etc. are placed in the space between the front cover 1101 and the back cover 1103. The mid frame 1102 supports the display panel 1100, and spatially separates the display panel 1100 and the mainboard 1104 from each other. A flexible circuit board 1130 of the display module is connected to the mainboard 1104 through a slot in the mid frame 1102.

Circuits in a host system are mounted on the mainboard 1104. The host system comprises a display module, a wireless communication module, a short-range communication module, a mobile communication module, a broadcast receiving module, A/V inputs, a GPS (global positioning system) module, a power circuit, etc. The power circuit supplies the voltage of the battery 1105 to the host system and a module power supply unit of the display panel driving circuit after removing noise.

Moreover, flexible displays have become commercially viable recently. For example, a flexible display reproduces input images in a display area of a display panel where plastic OLEDs (organic light-emitting diodes) are formed. The plastic OLEDs are formed on a flexible plastic substrate. The flexible display can come in various designs and offers benefits in portability and durability. Flexible displays are adopted in a diverse range of applications including TV (television), car displays, and wearable devices, as well as mobile devices such as smartphones and tablet PCs, by adding a touchscreen panel comprising touch sensors.

Hereinafter, a flexible display with bent edges BA according to the related art will be described with reference to FIGS. 3 through 6. FIG. 3 is a view schematically showing a flexible display with bent edges BA according to the related art. FIG. 4 is a view showing a method of forming a flexible display with bent edges BA according to the related art. FIGS. 5 and 6 are views for explaining problems with the process method of FIG. 4.

Referring to FIG. 3, the flexible display according to the related art comprises a display panel 3 and a cover glass 5. The display panel 3 has a flat area FA and bent edges BA. The cover glass 5 is bonded to the display panel 3, and has a flat area FA and bent edges BA which correspond to the display panel 3. The display panel 3 and the cover glass 5 may be bonded together with an adhesive 7, for example, optically clear adhesive (OCA).

Referring to FIG. 4, in the related art, a cover glass 5 and a flexible display panel 3 are provided to form a display device with bent edges BA. The cover glass 5 is pre-shaped to have bent edges BA using a mold, etc.

The pre-shaped cover glass 5 and the display panel 3 are placed opposite each other. The adhesive 7 is interposed between the display panel 3 and the cover glass 5 as shown in (a) of FIG. 4. The display panel 3 with the adhesive 7 attached to it is bonded to one side of the cover glass 5, and then laminated using a roller 9 as shown in (b) of FIG. 4. The roller 9 may roll from one side of the cover glass 5 to the other side. Through these process steps, bent edges BA corresponding to the shape of the bent edges BA of the cover glass 5 are formed on the flexible display panel 3.

However, the above-described process method has its limitations in forming a display device which can be modified in various ways. For example, use of the above-described process has its limitations in forming a display device with a display area that extends all the way to the back across the front and side as shown in FIG. 5, rather than only over the front and side as shown in FIG. 3. Specifically, referring to (a) of FIG. 6, if the radius R of curvature of the bent area BA is small, the roller 9 may not be able to fit into the bent area BA, and the movement path of the roller 9 may be limited.

In another method, referring to (b) of FIG. 6, a display panel 3 with pre-shaped bent edges BA may be fitted into a cover glass 5 with pre-shaped bent edges BA. However, the adhesive 7 interposed between the cover glass 5 and the display panel 3 may squeeze out when the display panel 3 is fitted into the cover glass 5, and the area AR of contact between the cover glass 5 and the display panel 3 may be damaged due to friction, etc. These defects can degrade product yield and product reliability.

SUMMARY OF THE INVENTION

The present invention has been made in an effort to solve or address the above-described problems and other limitations associated with the related art, and to provide a display device having a bent area with a curved shape, which is made easier to manufacture, by having a support plate, and an electronic device comprising the same.

In one aspect, a display device includes a support plate having a flat area and a bent area, a display panel bonded to the support plate and bent along the bent area of the support plate, and a cover glass bonded to the display panel and bent along the bent area of the support plate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. The names of the elements used in the following description may be selected for ease of writing the specification, and may be different from the names of parts in actual products.

Figure 1:
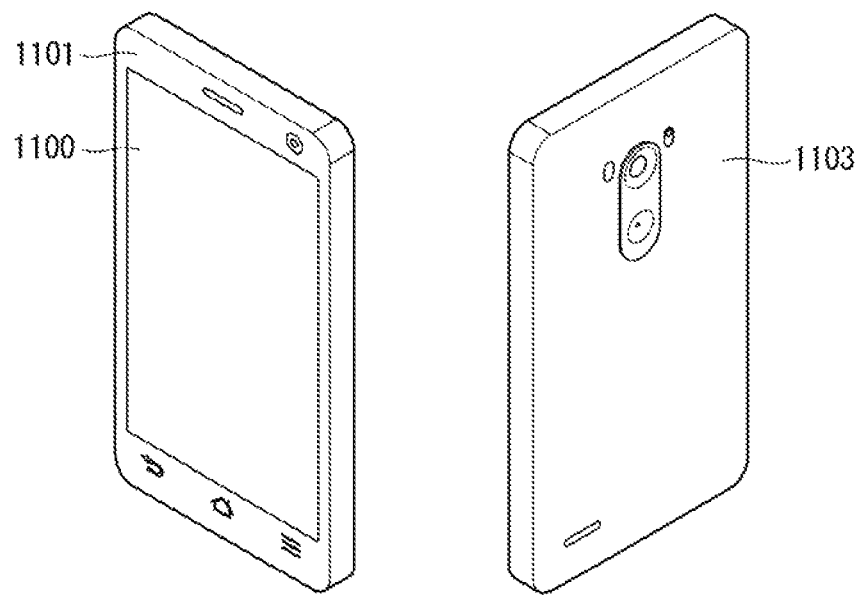
FIGS. 1 and 2 are views schematically showing a terminal according to the related art.
Figure 2:
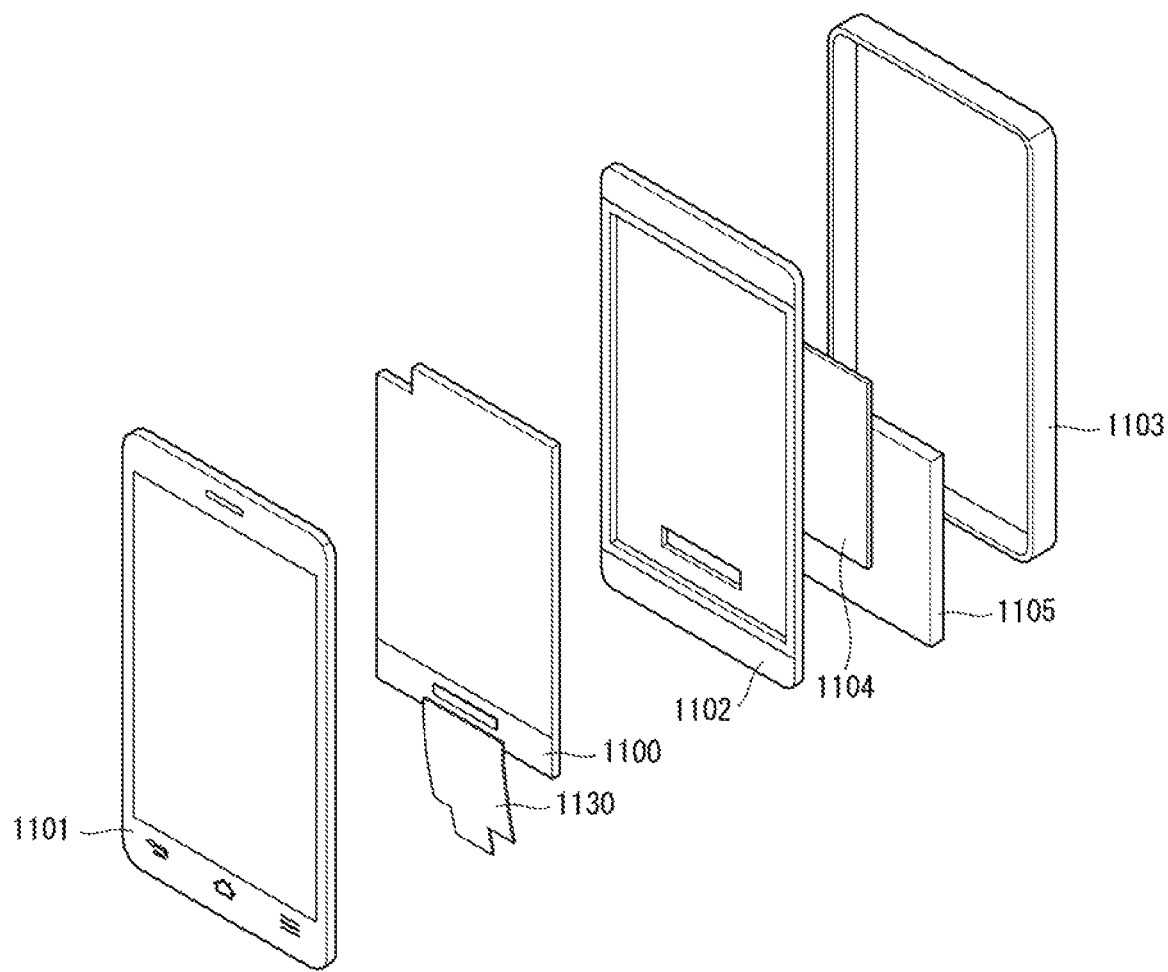
Figure 3:
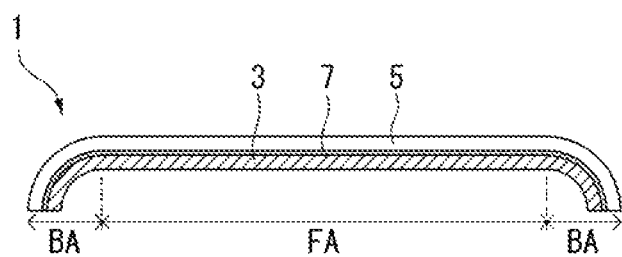
FIG. 3 is a view schematically showing a flexible display with bent areas BA according to the related art.
Figure 4:
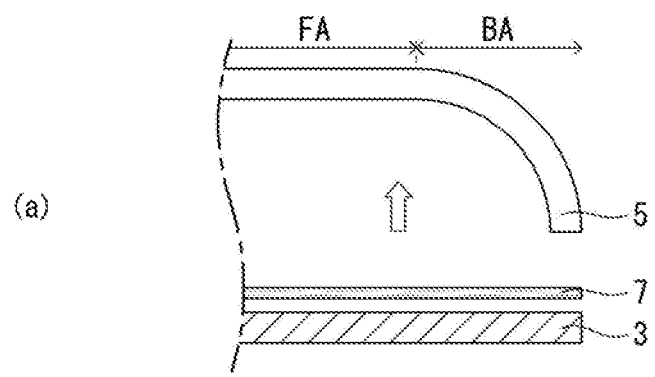
FIG. 4 is a view showing a method of forming a flexible display with bent areas BA according to the related art.
Figure 4:
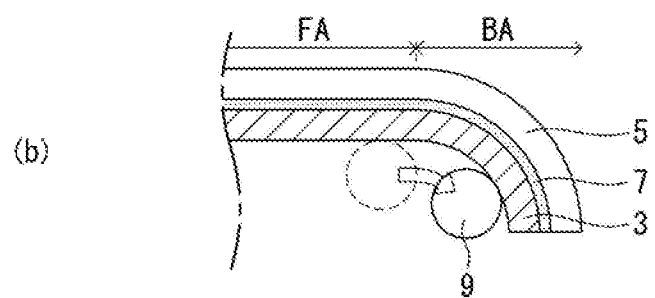
Figure 5:
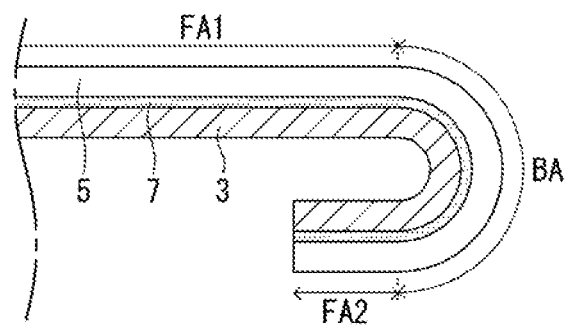
FIGS. 5 and 6 are views for explaining problems with the process method of FIG. 4.
Figure 6:
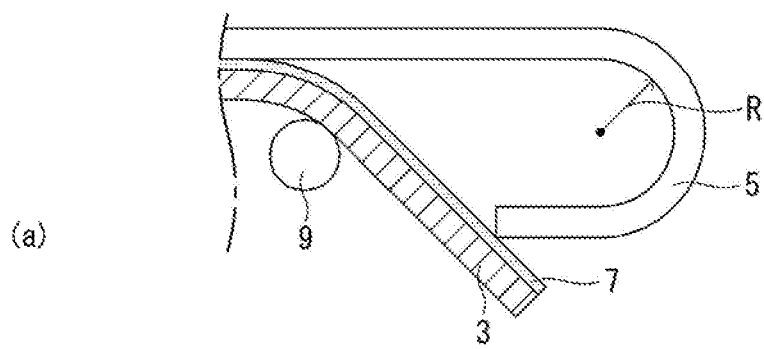
Figure 6:
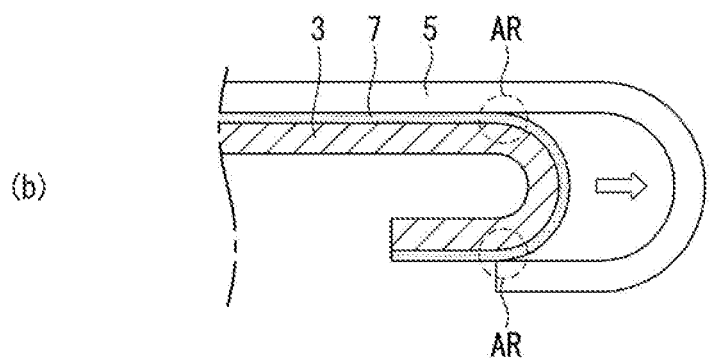
Figure 7:
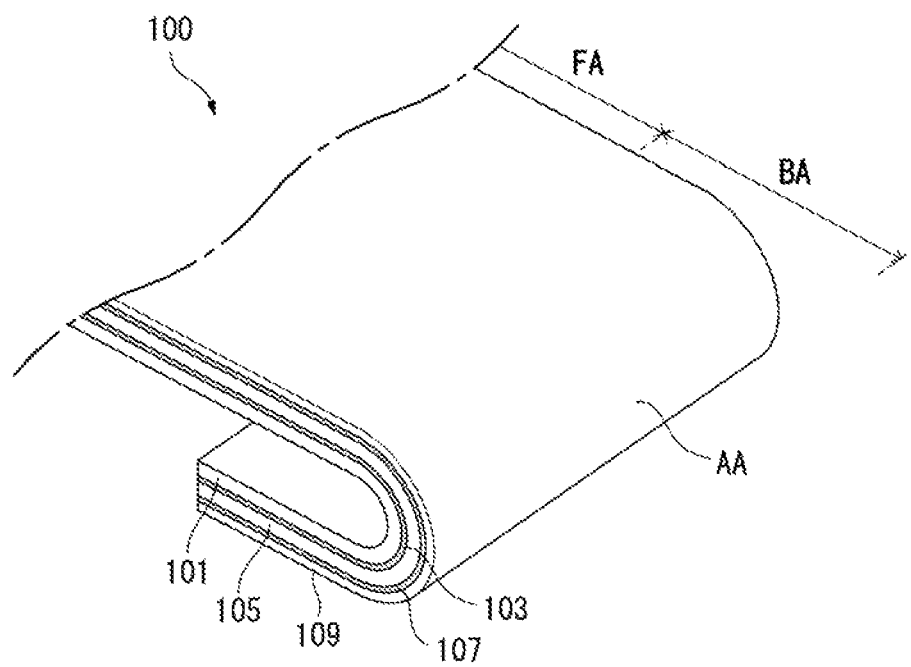
FIG. 7 is a perspective view schematically showing a display device according to an embodiment of the present invention.

Hereinafter, a display device according to the present invention will be described with reference to FIG. 7. FIG. 7 is a perspective view schematically showing a display device according to an embodiment of the present invention.

Referring to FIG. 7, a display device 100 according to the present invention comprises a support plate 101, a display panel 105, and a cover glass 109. All the components of the display device according to all embodiments of the present invention are operatively coupled and configured.

The support plate 101 has a flat area FA and a bent area BA. The display panel 105 is bonded to the support plate 101, and bends along the bent area BA of the support plate 101. The cover glass 109 is bonded to the display panel 105, and bends along the bent area BA of the support plate 101.

The bent area BA extends from the flat area FA, and bends towards the back of the display device 100. For example, the bent area BA may extend from the flat area FA, and bend at 180 degrees towards the back of the display device. In this case, a display surface may be formed along the bent area BA on at least one among the front, side, and back of the display panel 105. The display surface refers to the area where a display area AA is defined and input images are actually displayed. In the present invention, the display surface refers to the surface on which the display area AA is defined, among the surfaces on which the display panel 105 and the cover glass 109 make contact with each other.

The flat area FA refers to an area on the support plate 101 which is flat. The bent area BA extends from at least one side of the flat area FA. The bent area BA refers to an area which forms a curved shape by bending one side edge of the support plate 101. The bent area BA may extend from the flat area FA, and be bent to a certain curvature. The bent area BA may have a U-shape. That is, the bent area BA, extending from an edge of the flat area FA, may be curved at 180 degrees towards the back of the display panel 105. The shape of the support plate 101—especially, the shape of the bent area BA—determines the final shape of the display device 100. The display device 100 according to the present invention comprises a support plate 101 that determines the shape of the bent area BA of the display device 100.

The support plate 101 is made of a material with a certain level of rigidity so that it retains the curved shape on the bent area BA. For example, the support plate 101 may be made of one of a number of metals, such as stainless steel (SUS), aluminum (Al), magnesium (Mg), and their alloys. The support plate 101 may be formed by bending a prepared piece of metal by pressing it into a mold. In another example, the support plate 101 may be made of plastic. The support plate 101 may be formed by shaping a plastic by extrusion and cutting it. In yet another example, the support plate 101 may be made of carbon fiber reinforced plastic (CFRP). The support plate 101 may be formed by molding a material into a shape and then hardening it by heating.

The support plate 101 may be bonded to the back of the display panel 105 and function as a support structure for the display panel 105. The display panel 105, when bent, tends to retain its original shape by a restoring force. The support plate 101 is bonded to the back of the display panel 105 and supports the display panel 105 so that the bent area BA does not return to the original state but retains the curved shape. Also, the support plate 101 is bonded to the display panel 105 with a first adhesive 103 such as PSA (pressure sensitive adhesive) so that the display panel 105 is held in place without falling out. The support plate 101 may be bonded to the entire area of the display panel 105 with the first adhesive 103 and held the entire area of the display panel 105 in place. To prevent visibility deterioration caused when the boundary between the adhesive part and the no adhesive part is seen from the outside, the adhesive may be interposed at least between the display area AA of the display panel 105 and the support plate 101.

The display panel 105 is placed over the top side of the support plate 101. The display panel 105 comprises pixels for reproducing input images. The display panel 105 is manufactured with a bendable material. For example, the pixels may comprise, but are not limited to, organic light-emitting diodes (hereinafter, "OLED") formed on a flexible plastic substrate. In the following description, the display panel 105 is implemented with plastic OLEDs, by way of example.

The display panel 105 comprises a flat area FA and a bent area BA. The flat area FA refers to an area on the display panel 105 which is flat. The bent area BA extends from at least one side of the flat area FA. The bent area BA refers to an area which forms a curved shape by bending one side edge of the display panel 105. The bent area BA may extend from the flat area FA, and be bent to a certain curvature. The display panel 105 is placed on the support plate 101 to match the shape of the support plate 101. The flat area FA and bent area BA of the display panel 105 correspond to the flat area FA and bent area BA of the support plate 101, respectively.

The pixels on the display panel 105 may be defined by data lines and gate lines. Each pixel comprises an OLED which is self-emissive. The OLED comprises an anode, a cathode, and an organic compound layer interposed between the anode and the cathode. The organic compound layer comprises an emission layer EML, and may comprise a common layer. The common layer may comprise at least one selected from the group consisting of a hole injection layer HIL, a hole transport layer HTL, an electron transport layer ETL, and an electron injection layer EIL.

On the display panel 105, pixels each comprising an OLED are arranged in a matrix, and the luminance of the pixels is adjusted depending on the grayscale value of video data. Each pixel comprises a driving TFT that controls drive current flowing through the OLED depending on a gate-source voltage, a storage capacitor that keeps the gate-source voltage of the driving TFT constant for one frame, and at least one switching TFT that programs the gate-source voltage of the driving TFT in response to a gate pulse (or scan pulse). The drive current is determined by the gate-source voltage of the driving TFT relative to a data voltage and the threshold voltage of the driving TFT, and the luminance of the pixels is proportional to the amount of drive current flowing through the OLED.

Input images may be presented on the bent area BA, as well as the flat area FA. That is, the display area AA may be defined on at least one between the flat area FA and bent area BA of the display panel 105 as the need arises. Also, the display area AA may be defined on part or the entire flat area FA and bent area BA. The area other than the display area AA is a non-display area. The display device 100 according to the present invention may present images on at least one between the side and back of the display device 100, as well as on the front, by comprising the bent area BA. Accordingly, the present invention provides a display device 100 which improves the user's convenience and the aesthetic appeal of the product.

The cover glass 109 is placed over the top side of the display panel 105. The cover glass 109 is bonded to the display panel 105 with a second adhesive 107 such as OCA (optically clear adhesive). The cover glass 109 comprises a flat area FA and a bent area BA. The flat area FA refers to an area on the cover glass 109 which is flat. The bent area BA extends from at least one side of the flat area FA. The bent area BA refers to an area which forms a curved shape by bending one side edge of the cover glass 109. The bent area BA may extend from the flat area FA, and be bent to a certain curvature. The cover glass 109 is placed on the display panel 105 to match the shape of the display panel 105. The flat area FA and bent area BA of the cover glass 109 correspond to the flat area FA and bent area BA of the display panel 105, respectively.

The cover glass 109 may be made of a glass substrate thin enough to bend to different curvatures. To form a bent area BA with a small radius of curvature on the cover glass 109, a thin glass substrate with a thickness of 0.1 t or less may be used.

The cover glass 109 may be reinforced. The cover glass 109 may be physically or chemically reinforced. In an example, the cover glass 109 may be physically reinforced by heating a glass substrate to a high temperature for a certain period of time and rapidly cooling the surface of the glass substrate by air, etc. so as to create compressive stress on the surface of the glass substrate and tensile stress in it. In another example, the cover glass 109 may be chemically reinforced by forming a stress layer on the glass surface through the exchange of ions. Reinforcing the cover glass 109 may increase the strength of the cover glass 109 which is fragile to stress.

An antifouling coating layer may be coated on the top side of the cover glass 109. This can prevent the surface of the cover glass 109 from becoming fouled with contaminants. The antifouling coating layer may comprise at least one among anti-finger coating, anti-scratch coating, and anti-corrosion coating.

Figure 8:
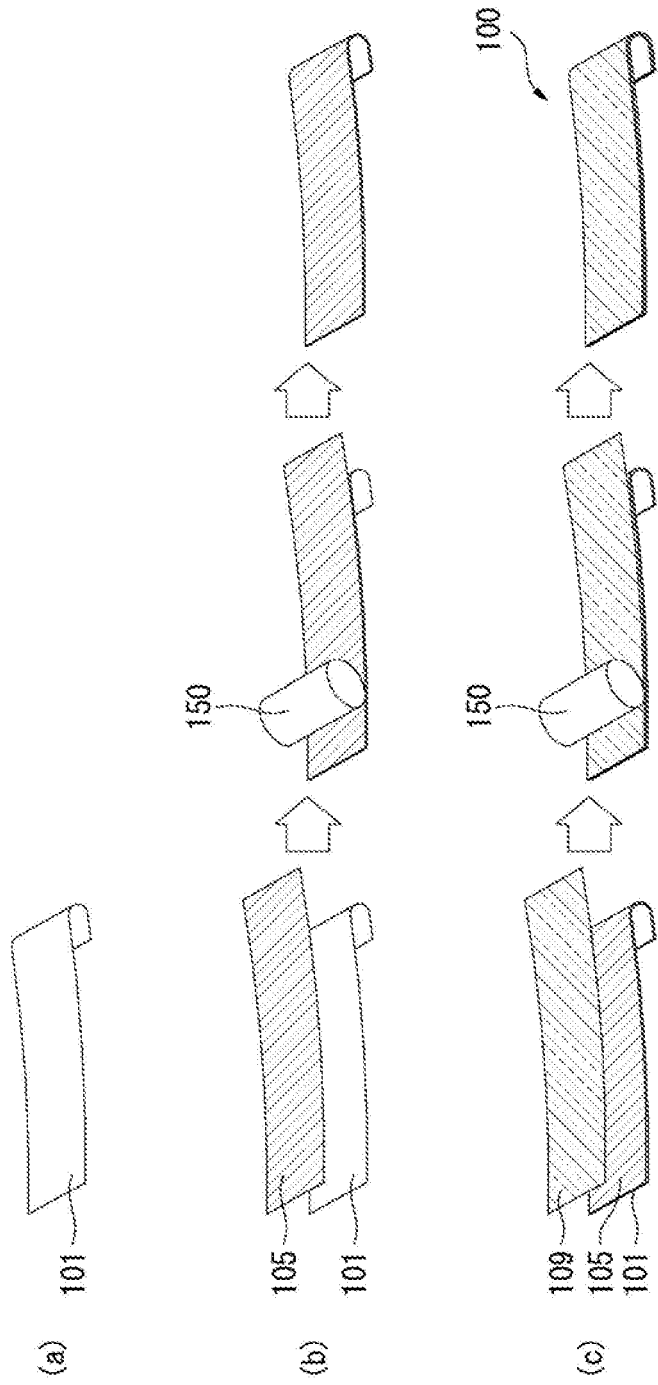
FIG. 8 shows images for explaining a method of manufacturing a display device according to an embodiment of the present invention.

Hereinafter, a method of manufacturing a display device according to an embodiment of the present invention will be described with further reference to FIG. 8. Based on this manufacturing method, the characteristics of the display device according to the present invention will be described in more detail. FIG. 8 shows images for explaining a method of manufacturing a display device according to the present invention.

Referring to (a) of FIG. 8, a support plate 101 with a flat area FA and a bent area BA is prepared. The shape of the support plate 101 is determined by taking into account the final shape of the display device 100. Afterwards, a display panel 105 and cover glass 109 to be laminated may deform and retain the deformed shape, corresponding to the shape of the support plate 101. Especially, the shape of the bent area BA of the support plate 101 determines the final shape of the bent area BA of the display device 100.

Referring to (b) of FIG. 8, a display panel 105 is placed on the support plate 101 shaped to have a bent area BA, facing the support plate 101. A first adhesive 103 is interposed between the support plate 101 and the display panel 105. One side of the display panel 105 is bonded to one side of the support plate 101, with the first adhesive 103 in between them, and then laminated using a roller 150. The roller 150 rolls from one side of the support plate 101 to the other side. The display panel 105 has a bent area BA corresponding to the shape of the support plate 101 by the lamination process.

Referring to (c) of FIG. 8, the cover glass 109 is placed on the laminated support plate 101 and display panel 105, facing them. A second adhesive 107 is interposed between the display panel 105 and the cover glass 109. A transparent adhesive layer such as OCA may be interposed between them. One side of the cover glass 109 is bonded to one side of the display panel 105, with the second adhesive 107 in between them, and then laminated using a roller 150. The roller 150 rolls from one side of the display panel 105 to the other side. The cover glass 109 has a bent area BA corresponding to the shape of the support plate 101 by the lamination process. As such, the display device 100 according to the present invention 100 is completed by laminating the support plate 101, display panel 105, and cover glass 109, each with a bent area BA having the same shape. According to the present invention, a display device having a bent area BA with a curved shape, which was not easy to manufacture, can be manufactured by having a novel component, i.e., the support plate 101.

Figure 9:
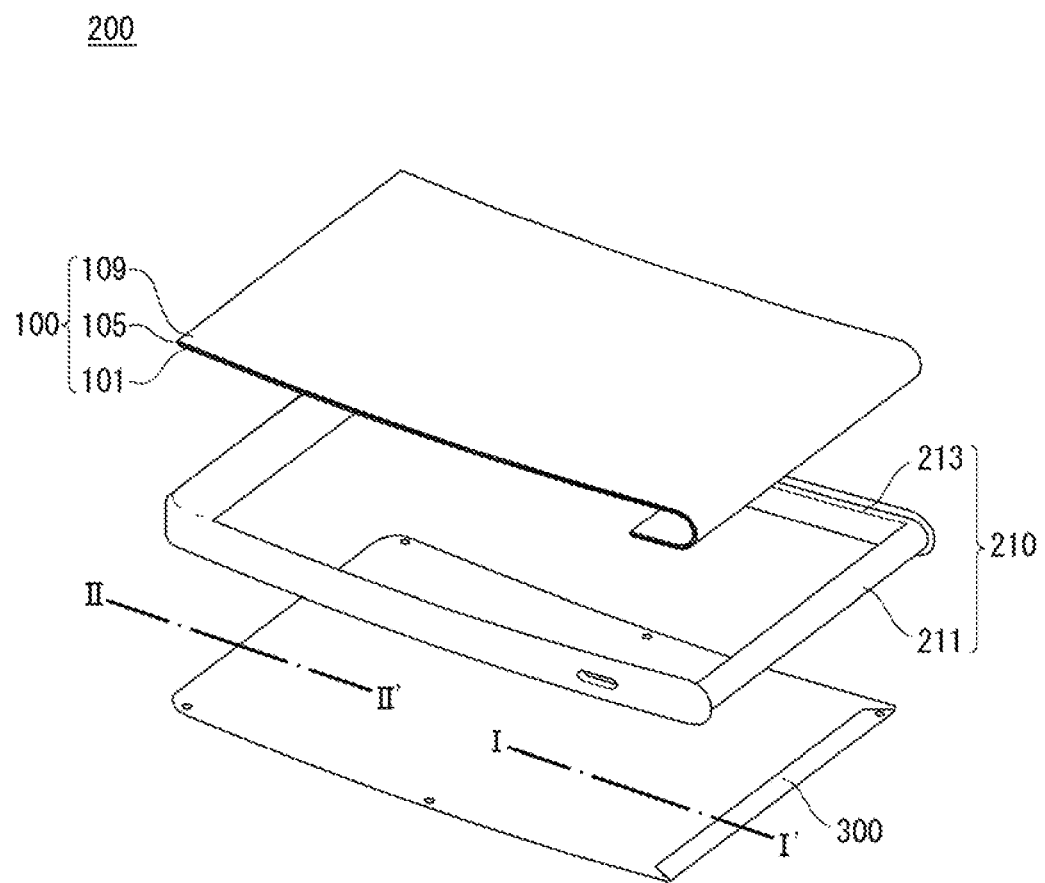
FIG. 9 is an exploded perspective view schematically showing an electronic device according to an embodiment of the present invention.

Hereinafter, an electronic device according to an embodiment of the present invention will be described with reference to FIGS. 9 and 10. FIG. 9 is an exploded perspective view schematically showing an electronic device according to the present invention. Further, (a) of FIG. 10 is a cross-sectional view schematically showing an electronic device according to the present invention, taken along the line I-I' of FIG. 9, whereas (b) of FIG. 10 is a cross-sectional view schematically showing an electronic device according to the present invention, taken along the line II-II' of FIG. 9.

Figure 10:
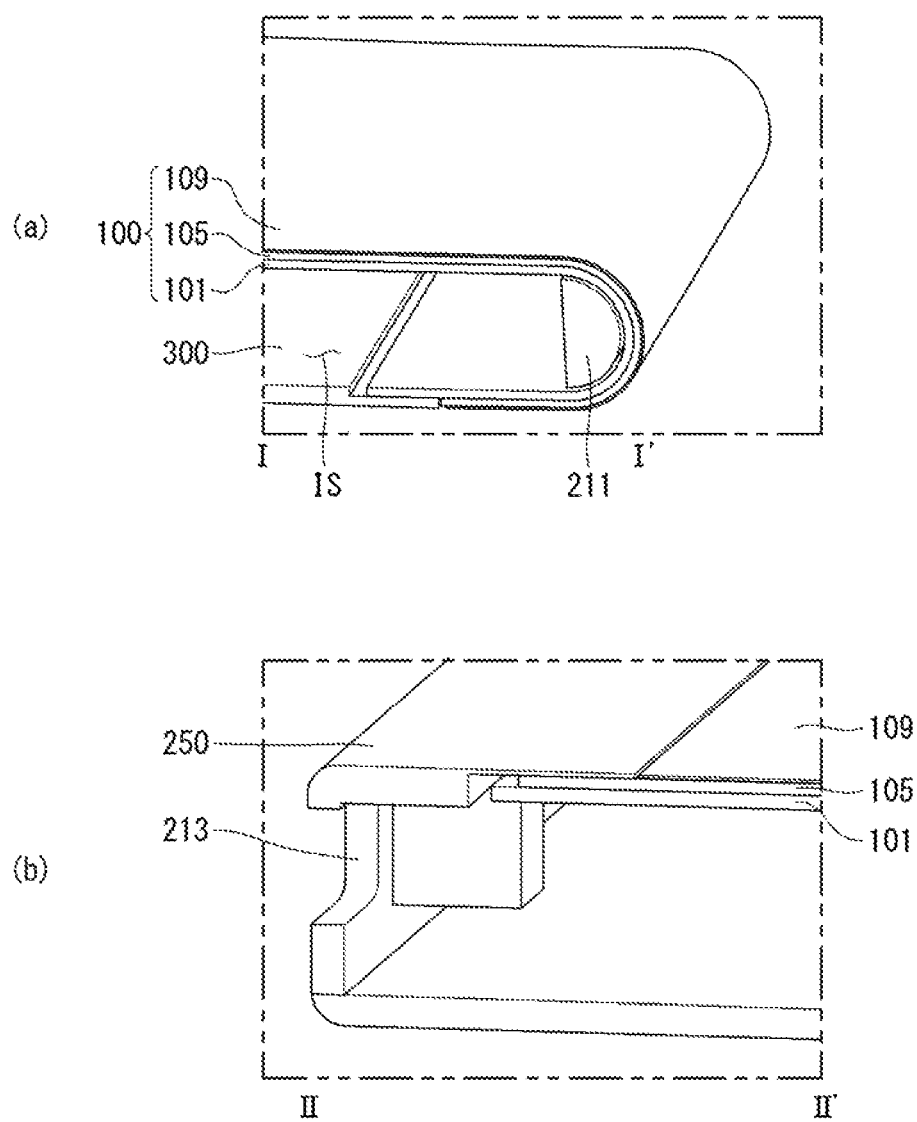
FIG. 10 is a cross-sectional view schematically showing an electronic device according to an embodiment of the present invention, taken along the line I-I' of FIG. 9 which is shown in (a) of FIG. 10, and taken along line II-II' of FIG. 9 which is shown in (b) of FIG. 10.

Referring to FIGS. 9 and 10, the electronic device 200 according to the present invention comprises a display device 100, a surrounding frame 210, a front cover 250, and a back cover 300. Here, the term "cover" may be substituted with case or housing.

The display device 100 comprises a support plate 101, a display panel 105, a cover glass 109, and a display panel driving circuit that are sequentially laminated. A touchscreen panel with touch sensors may be placed on the display panel 105. The display panel driving circuit comprises a drive IC (integrated circuit) and a flexible circuit board that connects the drive IC to a mainboard. The drive IC writes image data input through the mainboard to the pixels on the display panel 105. The flexible circuit board may be either an FPC (flexible printed circuit board) or an FFC (flexible flat cable).

The surrounding frame 210 supports the four edges of the support plate 101 from the back. The surrounding frame 210 is open in the middle. The surrounding frame 210 comprises a support block 211 and an auxiliary block 213. The support block 211 refers to a block that fits into the bent area BA of the support plate 101. The number of support blocks 211 corresponds to the number of bent areas BA. The cross-sectional shape of the support block 211 corresponds to the shape of the bent area BA of the support plate 101. The cross-section of the support block 211 may be circular or semicircular. The support block 211 may fit into the bent area BA of the support plate 101 and support it from the inside so that the bent area BA of the support plate 101 retains the curved shape. For example, the support block 211 is capable of preventing the bent area BA of the support plate 101 from deforming due to an applied external force. The auxiliary block 213 extends from an edge of the support block 211 and supports the corresponding edge of the support plate 101 from the back. The auxiliary block 213 may further comprise a fastening structure for holding the support plate 101 in place. The support block 211 and the auxiliary block 213 may be formed as a single body.

The front cover 250 is placed over the auxiliary block 213 on one side. The front cover 250 may further comprise a fastening structure for holding the support plate 101 in place. The front cover 250 may be placed in such a way as to cover part of at least one among the laminated support plate 101, display panel 105, and cover glass 109. The front cover 250 may function to prevent the display device 100 from falling out. The back cover 300 is placed opposite the support plate 101, with the surrounding frame 210 in between them. The back cover 300 may be fastened to the surrounding frame 210 with screws, rivets, etc. The back cover 300 may further comprise a fastening structure for holding the support plate 101 in place. In this case, the fastening structure is provided in the area of contact between the bent area BA of the support plate 101 and the back cover 300.

A camera and various types of sensors may be placed on the front of the front cover 250 and/or the back of the back cover 300. The sensors are sensors that can be adapted to the electronic device 200, including a proximity sensor, a geomagnetic sensor, a motion sensor, an illumination sensor, an RGB sensor, a Hall sensor, a temperature/humidity sensor, a heartbeat sensor, a fingerprint sensor, etc., for example.

Electronic parts are mounted in an internal space IS between the support plate 101 and the back cover 300. The electronic parts may comprise a mainboard, battery, etc. The support plate 101 supports the display panel 105 from the back, and spatially separates the display panel 105 and the mainboard from each other. The flexible circuit board may bypass the support plate 101, or be connected to the mainboard through a slot in the support plate 101. That is, the support plate 101 may serve as an intermediary for electrically connecting parts like the display panel 105, mainboard, battery, etc.

Further, A/V (audio/video) inputs, a user input section, a speaker, a microphone, etc. may be installed in the internal space IS between the support plate 101 and the back cover 300. The A/V inputs, user input section, speaker, and microphone are connected to the mainboard. The user input section may consist of a touch keypad, a dome switch, a touch pad, a jog wheel, a jog switch, etc.

Circuits in a host system are mounted on the mainboard. The host system comprises a display module, a wireless communication module, a short-range communication module, a mobile communication module, a broadcast receiving module, A/V inputs, a GPS (global positioning system) module, a power circuit, etc. The user input section, speaker, microphone, battery, etc. are connected to the host system. The power circuit supplies the voltage of the battery to the host system and a module power supply unit of the display panel driving circuit after removing noise.

The electronic device 200 according to the present invention may comprise a mobile phone, a smartphone, a laptop computer, a digital broadcasting terminal (or a digital broadcasting receiver), a PDA (personal digital assistant), a PMP (portable multimedia player), a navigation system, a slate PC, a table PC, an ultrabook, a wearable device (e.g., smartwatch, smart glass, and HMD (head-mounted display), etc.

Figure 11:
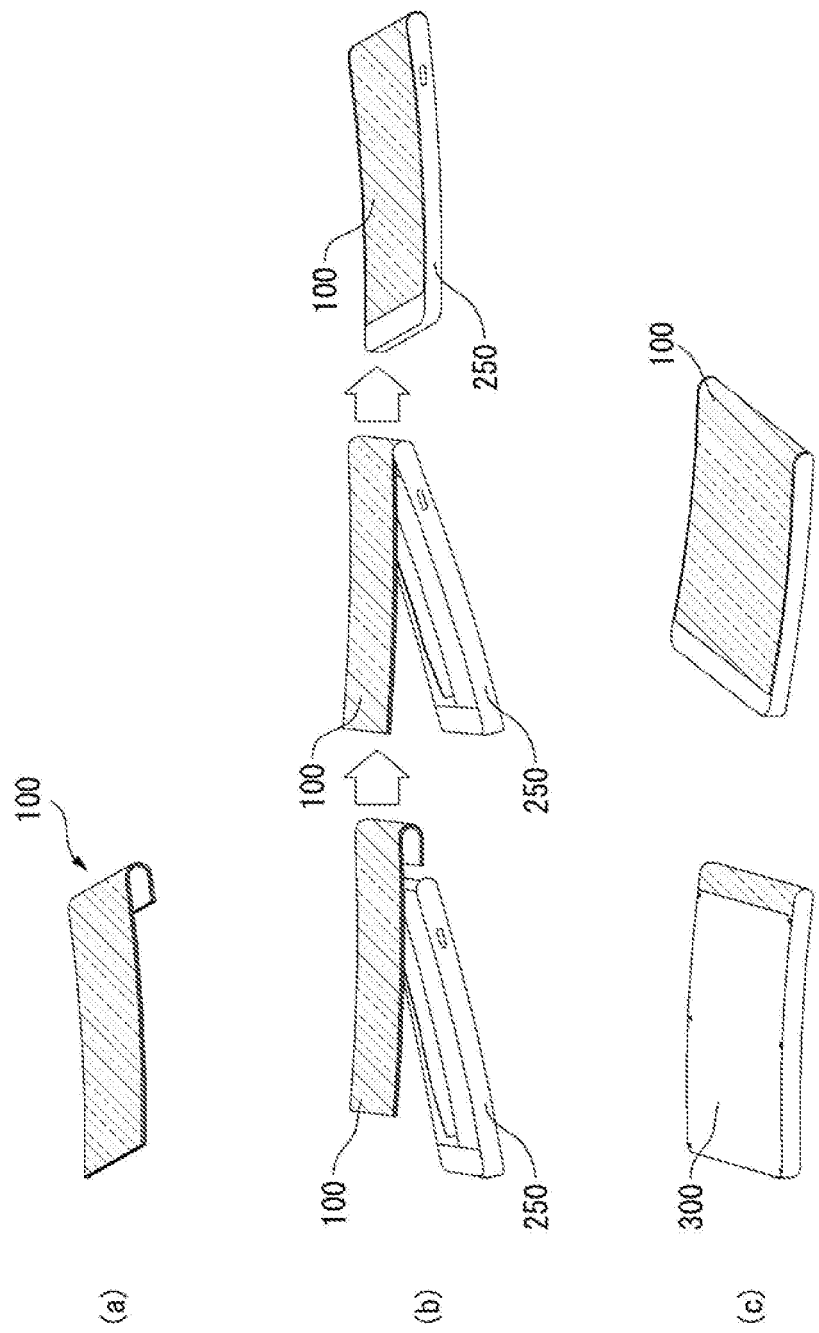
FIG. 11 shows images for explaining a method of manufacturing an electronic device according to an embodiment of the present invention.

Hereinafter, a method of manufacturing an electronic device according to an embodiment of the present invention will be described with reference to FIG. 11. FIG. 11 shows images for explaining a method of manufacturing an electronic device according to the present invention.

Referring to (a) of FIG. 11, a display device 100 with a flat area FA and a bent area BA is prepared. The display device 100 comprises a support plate 101, a display panel 105, and a cover glass 109 that are sequentially laminated.

Referring to (b) of FIG. 11, the support block 211 of the surrounding frame 210 fits into the bent area BA of the display device 100, that is, the bent area BA of the support plate 101. The cross-sectional shape of the support plate 211 and the curved shape of the bent area BA correspond to each other. The support plate 101 and the front cover 250 and/or the support plate 101 and the auxiliary block 213 of the surrounding frame 210 may be joined together by a fastening structure.

Referring to (c) of FIG. 11, the back cover 300 is placed opposite the display device 100, with the surrounding frame 210 in between them. The back cover 300 may be joined to the auxiliary block 213 of the surrounding frame 210 by a fastening structure. The back cover 300 may be joined to one end of the bent area BA of the support plate 101 by a fastening structure. As such, the electronic device 200 according to the present invention is completed. According to an exemplary embodiment of the present invention, a display device 100 having a bent area BA with a curved shape and an electronic device 200 comprising the same, which were not easy to manufacture, can be manufactured by having the support plate 101. Accordingly, the exemplary embodiment of the present invention provides a display device with improved product yield and product reliability and an electronic device comprising the same.

Hereinafter, an example of using an electronic device according to an embodiment of the present invention will be described with reference to FIG. 12.

Figure 12:
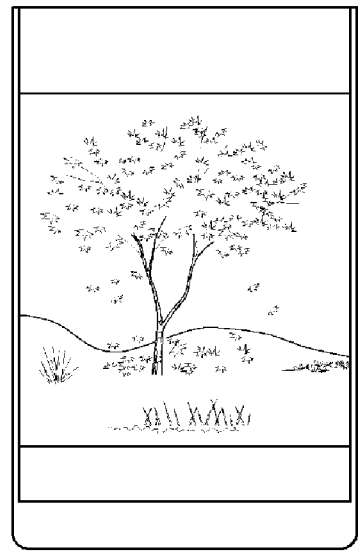
FIG. 12 shows images of an example of using an electronic device according to an embodiment of the present invention.
Figure 12:
Figure 12:
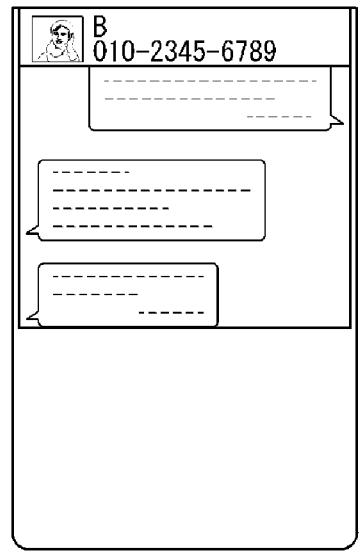

More specifically, (a) of FIG. 12 illustrates an input image presented on the front of an electronic device, (b) of FIG. 12 illustrates an input image presented on the side of the electronic device, and (c) of FIG. 12 illustrates an input image presented on the back of the electronic device.

The electronic device according to the present invention displays input images on at least one among the front, side, or back. Accordingly, the user can let image information be presented on anywhere on the front, side or back the user wants by operating the electronic device. Also, the user may set the electronic device in such a way that an input image is presented on a specific portion, corresponding to a particular environment.

As such, the electronic device according to the present invention lets the user view image information from the electronic device on any part of the electronic device since the display surface is formed on the front, side, and back. The present invention can provide an electronic device with improved user convenience.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a support plate having a flat area with a flat shape, and a bent area with a curved shape;
a display panel bonded to the support plate and bent along the bent area of the support plate;
a first adhesive interposed between the support plate and the display panel, the first adhesive being a pressure sensitive adhesive;
a cover glass bonded to the display panel and bent along the bent area of the support plate along a curved outer surface of the display panel;
a second adhesive interposed between the display panel and the cover glass, the second adhesive being an optically clear adhesive;
a back cover on a back of the support plate, the back cover covering an end of the display panel; and
a front cover covering the other end of the display panel,
wherein the cover glass is disposed between the front cover and the back cover,
wherein the support plate is rigid and is unmodifiable once the curved shape on the bent area and the flat shape on the flat area are formed, the display panel retains a curved shape along a curved outer surface of the support plate, and the cover glass retains a curved shape along the curved outer surface of the display panel,
wherein a display surface is formed by the display panel along the bent area of the support plate on at least a front and a back of the display device,
wherein the support plate supports the display surface at both the front and the back of the display device,
wherein the support plate supports the display panel and the cover glass continuously from the flat area through the bent area from the front to the back of the display device,
wherein a bent area between the front to the back of the display device lacks a flat portion,
wherein the bent area of the support plate extends from the flat area of the support plate, and bends at 180 degrees towards the back of the display device,
wherein a bent area of the display panel extends from the flat area of the display panel, and bends at 180 degrees towards the back of the display device corresponding to a shape of the support plate, and
wherein a bent area of the cover glass extends from a flat area of the cover glass, and bends at 180 degrees towards the back of the display device corresponding to the shape of the support plate.

2. The display device of claim 1, wherein the bent area of the support plate extends from the flat area of the support plate, and bends towards the back of the display device.

3. The display device of claim 2, wherein the display surface is further formed on a side of the display device.

4. The display device of claim 1, wherein the display surface is further formed on a side of the display device.

5. The display device of claim 1, wherein the support plate is an innermost member among the support plate, the display panel, and the cover glass.

6. The display device of claim 1, wherein the support plate retains the curved shape on the bent area and the flat shape on the flat area, and the cover glass retains the curved shape along the curved outer surface of the display panel by being supported by the support plate.

7. The display device of claim 1, wherein the support plate is made of a metal or a rigid plastic.

8. The display device of claim 1, wherein the display panel includes a flexible substrate and pixels on the flexible substrate.

9. An electronic device comprising:
a display device comprising a support plate having a flat area with a flat shape, and a bent area with a curved shape, a display panel bonded to the support plate and bent along the bent area of the support plate, a cover glass bonded to the display panel and bent along the bent area of the support plate along a curved outer surface of the display panel, a first adhesive between the support plate and the display panel, and a second adhesive interposed between the display panel and the cover glass;

a surrounding frame supporting four edges of the support plate, the surrounding frame having a support block fitting into the bent area of the support plate, and an auxiliary block extending from an edge of side surfaces of the support block; and a back cover that supports a back of the surrounding frame, wherein the support plate is rigid and is unmodifiable once the curved shape on the bent area and the flat shape on the flat area are formed, the display panel retains a curved shape along a curved outer surface of the support plate, and the cover glass retains a curved shape along the curved outer surface of the display panel, wherein a display surface is formed by the display panel along the bent area of the support plate on at least a front and a back of the display device, wherein the support plate supports the display surface at both the front and the back of the display device, wherein the support plate supports the display panel and the cover glass continuously from the flat area through a bent area from the front to the back of the display device, wherein the bent area between the front to the back of the display device lacks a flat portion, wherein a bent area of the cover glass extends from a flat area of the cover glass, and bends at 180 degrees towards the back of the display device corresponding to a shape of the support plate, wherein the support block fits into the bent area bent at 180 degrees of the support plate and support the support plate at an inside of the bent area bent at 180 degrees so that the bent area of the support plate retains the curved shape, wherein the surrounding frame includes an opening surrounded by the support block and the auxiliary block in the middle, and wherein electronic parts are mounted in the opening of the surrounding frame between the support plate and the back cover.

10. The electronic device of claim 9, wherein a cross-sectional shape of the support block corresponds to a shape of the bent area of the support plate.

11. The electronic device of claim 9, further comprising a front cover covering an end of the display panel, wherein the auxiliary block is disposed between the back cover and the front cover, and wherein the back cover covers the other end of the display panel, so that the cover glass is disposed between the front cover and the back cover.

12. The electronic device of claim 11, wherein the electronic parts comprise at least one among a mainboard and a battery.

13. The electronic device of claim 9, wherein the support plate is an innermost member among the support plate, the display panel, and the cover glass.

14. The electronic device of claim 9, wherein the support plate retains the curved shape on the bent area and the flat shape on the flat area, and the cover glass retains the curved shape along the curved outer surface of the display panel by being supported by the support plate.

15. The electronic device of claim 9, wherein the support plate is made of a metal or a rigid plastic.

16. The electronic device of claim 9, wherein the display panel includes a flexible substrate and pixels on the flexible substrate.

17. The electronic device of claim 9, wherein the display surface is further formed on a side the display device.

18. The electronic device of claim 9, wherein the support block is in contact with the bent area of the support plate, entirely.

* * * * *